United States Patent
Kumar et al.

(10) Patent No.: US 6,448,980 B1
(45) Date of Patent: Sep. 10, 2002

(54) PERSONALIZING RICH MEDIA PRESENTATIONS BASED ON USER RESPONSE TO THE PRESENTATION

(75) Inventors: Keeranoor Kumar, Peekskill; James Lipscomb, Yorktown Heights; Jai Menon, Croton-on-Hudson, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/169,836

(22) Filed: Oct. 9, 1998

(51) Int. Cl.[7] ............................ G06F 3/00; G06F 13/00
(52) U.S. Cl. ...................... 345/745; 709/218; 709/219
(58) Field of Search ...................... 705/26, 27; 707/2, 707/104, 105; 709/247, 219, 218, 203, 217; 205/14, 10, 26, 27; 345/745, 744

(56) References Cited

U.S. PATENT DOCUMENTS

| | | | |
|---|---|---|---|
| 5,428,731 A | * 6/1995 | Powers, III | 707/501 |
| 5,446,891 A | * 8/1995 | Kaplan et al. | 707/2 |
| 5,469,206 A | 11/1995 | Strubbe et al. | 348/7 |
| 5,485,280 A | 1/1996 | Fujinami et al. | 358/335 |
| 5,528,490 A | 6/1996 | Hill | 364/403 |
| 5,551,021 A | 8/1996 | Harada et al. | 395/600 |
| 5,621,660 A | 4/1997 | Chaddha et al. | 364/514 |
| 5,644,324 A | 7/1997 | Maguire, Jr. | 345/9 |
| 5,696,869 A | 12/1997 | Abecassis | 386/52 |
| 5,706,290 A | 1/1998 | Shaw et al. | 370/465 |

(List continued on next page.)

OTHER PUBLICATIONS

Hsiangchu Lai et al., A System Architecture of Intelligent–guided Browsing on the Web, Proceedings of the 31st Hawaii International Conf on System Sciences, Jan. 1998, pp. 423–432.*

K. Kobayashi et al., Information presentation based on individual user interests, Knowledge–Based Intelligent Electronic Systems, Apr. 1998, pp. 375–383.*

Fabio A. Asnicar et al., User Model–Based Information Filtering, Artificial Intelligence Laboratory, University of Udine, www.dimi.uniud.it/~ift/aiia/html/AI_IA.html, Apr. 1997, 13 pages.*

*Primary Examiner*—Zarni Maung
*Assistant Examiner*—Patricia L. Winder
(74) *Attorney, Agent, or Firm*—Steven J. Meyers

(57) ABSTRACT

In response to an internet interrogation by a user for goods or services, a hypermedia presentation is provided that starts out with delivery and presentation of simple thumbnail descriptions of the available goods and services, and proceeds in steps through delivery and presentation of more complex descriptions. The presentations are arranged in segments and permit multiple modes of operation. Each mode has a different set of attributes that permit progress through the presentation in a different manner. When a user first enters a website, he is placed in navigation mode which enables him to browse the website by moving from category to category of goods, having an initial look at the offerings of each category. The user can then move on to the inspection and/or transaction modes. In the inspection mode: the user can examine in more detail the various aspects of the goods he is interested in; can change to a more detailed explanation; zoom in on various portions of the goods; and obtain related information. When the user enters the transaction mode, he is apparently ready to purchase the goods and is given appropriate options for this purpose such as: to obtain a quote; to ask for human assistance, and to trigger a transaction. As the user navigates through the presentation in one or more of its modes of operation, his selection process is monitored not only for this overt acts concerning selected goods and services, but also for other factors that may be revealed by the user's selection process.

27 Claims, 14 Drawing Sheets

U.S. PATENT DOCUMENTS

| | | | |
|---|---|---|---|
| 5,706,486 A | 1/1998 | Cruz et al. | 395/556 |
| 5,710,887 A | 1/1998 | Chelliah et al. | 395/226 |
| 5,719,786 A | 2/1998 | Nelson et al. | 364/514 |
| 5,721,832 A | 2/1998 | Westrope et al. | 395/227 |
| 5,727,048 A | 3/1998 | Hiroshima et al. | 379/93.12 |
| 5,732,239 A | 3/1998 | Tobagi et al. | 395/441 |
| 6,014,638 A * | 1/2000 | Burge et al. | 705/27 |
| 6,065,047 A * | 5/2000 | Carpenter et al. | 709/218 |
| 6,134,532 A * | 10/2000 | Lazarus et al. | 705/14 |

* cited by examiner

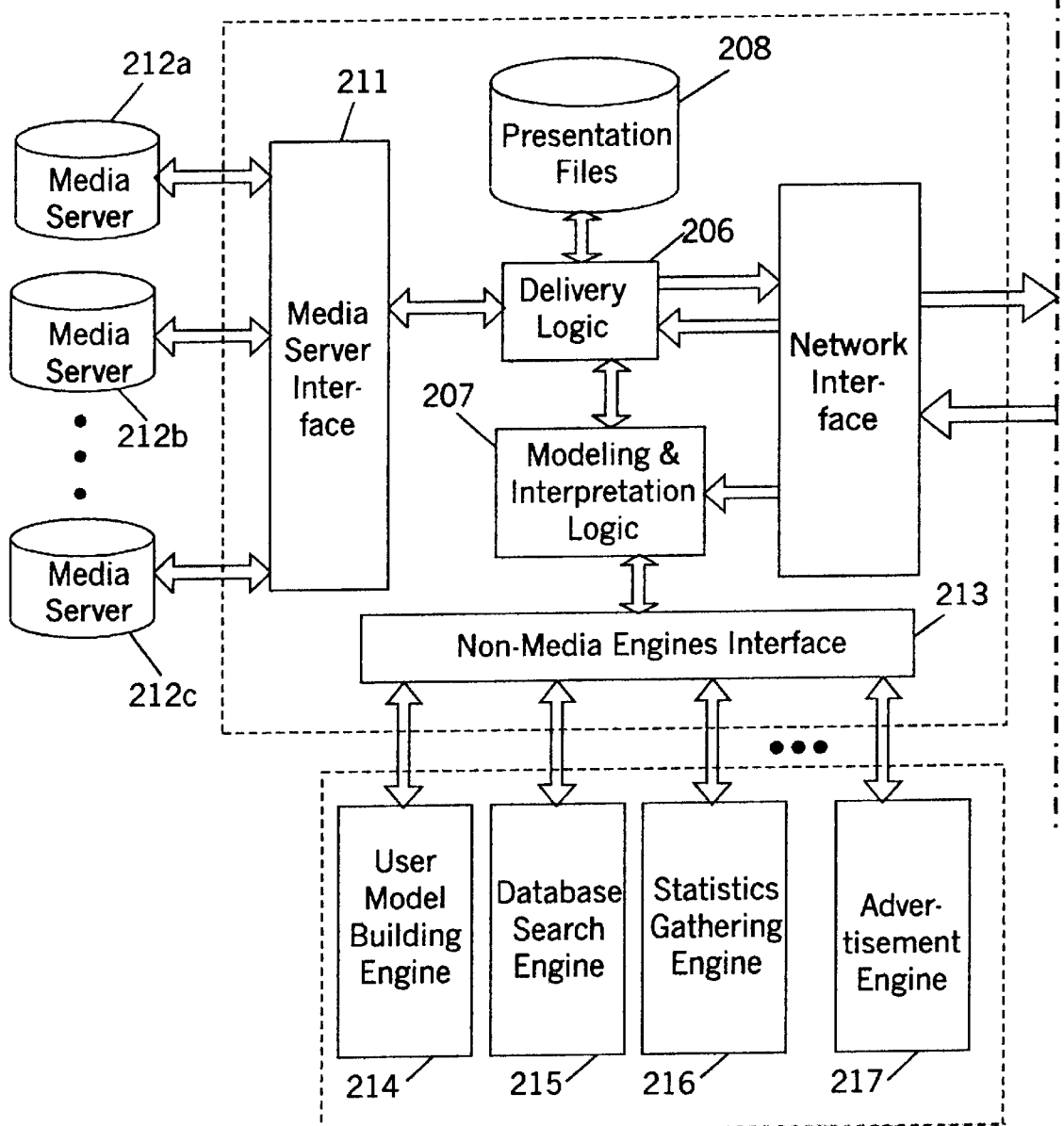

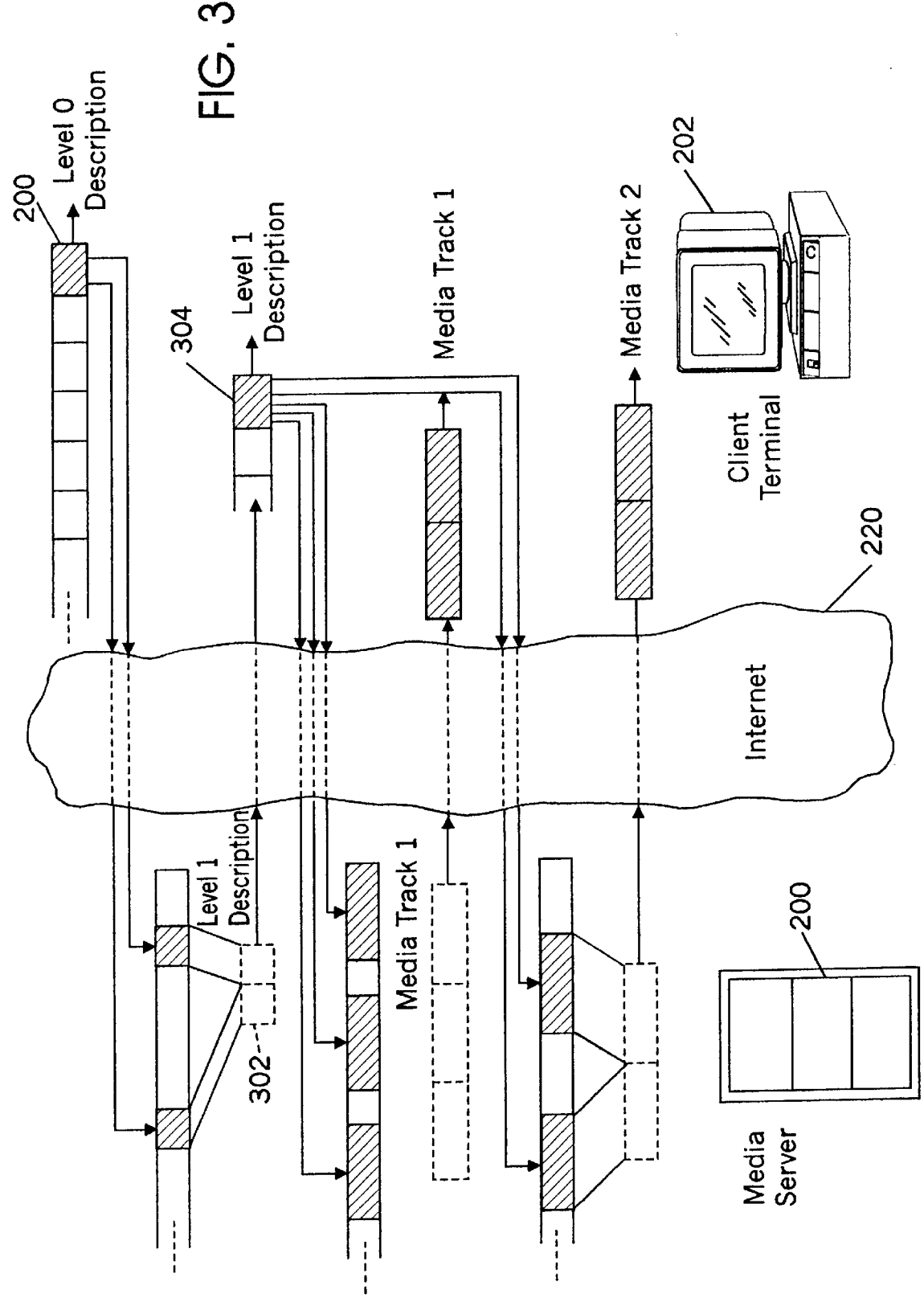

| FIG. 6A | FIG. 6B |

PERSONALIZING RICH MEDIA PRESENTATIONS BASED ON USER RESPONSE TO THE PRESENTATION

RELATED APPLICATIONS

U.S. patent application, Ser. No. 09/100,418 filed on Jun. 30, 1988 and entitled "Progressive Interleaved Delivery of Interactive Descriptions & Renderers for Electronic Publishing of Merchandise", which was issued into U.S. Pat. No. 6,230,162 on May 8, 2001 is hereby incorporated by reference.

FIELD OF THE INVENTION

The present invention relates to providing media descriptions of objects on the internet and more particularly, to modifying those descriptions as they are presented to the user based on a user's reaction to the descriptions.

BACKGROUND OF THE INVENTION

The internet is capable of presenting rich media presentations, containing still images, animated images, video images and audio. One problem with these presentations, is the need to transmit large blocks of code and data to the client. This is a serious impediment for presenting products to electronic commerce customers who are typically connected over low-bandwidth dial-up inks. They cannot be expected to pre-load code and data or wait for very long before their shopping experiences commence. This problem is addressed in the above referenced copending U.S. patent application Ser. No. 09/100,418, entitled "Progressive Interleaved Delivery of Interactive Descriptions & Renderers for Electronic Publishing of Merchandise" filed on Jun. 20, 1988. This copending application is hereby incorporated by reference.

A second problem concerns optimized delivery of various rich media to easily and effectively address the right amount of information about the merchandise to each user. Each user has different interests, needs and expectations. The presentations must be able to attract and maintain the attention of users with a wide variety of interests and needs, different personalities and varying attention spans. Gathering and presenting information for these and other purposes needed by the user to express his or her selection preferences is difficult with presently available approaches.

Therefore, it is an object of the present invention to provide an improved method and apparatus for providing rich media experiences.

It is another object of the invention to provide a new method and apparatus to provide rich data experiences tailored to the individual user.

It is a further object of the invention to provide to the user improved selection capability for navigation in rich media.

BRIEF DESCRIPTION OF THE INVENTION

In accordance with the present invention, network presentations to be rendered at the user's terminal are programmed to exploit the advantages of rich media to expand user's ability to effectively provide information about selection preferences back on the network to the transmitting website as the presentation proceeds. In response to interrogation by a user for goods of services, the system presents a hypermedia presentation that starts out with delivery and presentation of simple thumbnail descriptions of the available goods and services, and proceeds in steps through delivery and presentation of more complex descriptions. The presentations are arranged in segments and permit multiple modes of operation. Each mode has a different set of attributes that permit progress through the presentation in a different manner. When a user first enters a website, he is placed in navigation mode which enables him to browse the website by moving from category to category of goods, having an initial look at the offerings of each category. The user can then move on to the inspection and/or transaction modes. In the inspection mode, the user can examine in more detail the various aspects of the goods he is interested in changing to a more detailed explanation, zoom in on various portions of the goods and obtain related information. When the user enters the transaction mode, he is apparently ready to purchase the goods and is given appropriate options for this purpose such as obtaining a quote, ask for human assistance, and trigger a transaction.

As the user navigates through the presentation in one or more of its modes of operation, his selection process is monitored not only for his overt acts concerning selected goods and services, but also for factors revealed by the user's selection process. Among factors that are analyzed are the time the user spends with various aspects of the presentation; the manner the user prefers to interact with the media (i.e., by mouse, voice or keyboard); and the number of times the user returns to a particular subject. In this way, the system accumulates information about the user and his preference and modifies the presentation on the fly to accommodate them. For instance, if the product to be sold is a vehicle, the system would quickly determine what type of vehicle the user was interested in, the features that he considered important in the car and the desired price range. The presentation would then be modified to emphasize vehicles of the preferred type within the price range the user showed interest in. The presentation would emphasize features the user has shown interest in by expanding the presentation of the features which the user showed interest in. Furthermore, the presentation is changed based on the personality of the user. If the data indicates the user is impatient or has short attention span, the presentation is made short and to the point. If the user is interested in going into details, the presentation is extended to include factors not normality conveyed in the usual presentation. If the user responds to audio, the verbal presentation is emphasized. If he has shown a preference for animation, video segments will be bypassed. Once the user's interests have been determined, they are presented on a transaction page offering options that can be added to the decided on goods.

BRIEF DESCRIPTION OF THE DRAWINGS

A better understanding of the invention can be had by the following description of one embodiment thereof while referring to the accompanying figures of which:

FIGS. 2A and 2B are a block diagram showing a network server in accordance with the present invention connected to a client terminal on the internet;

FIG. 3 is a view of the interaction between the client terminal user and network server of FIG. 1;

DETAILED DESCRIPTION OF THE INVENTION

Figure 1:
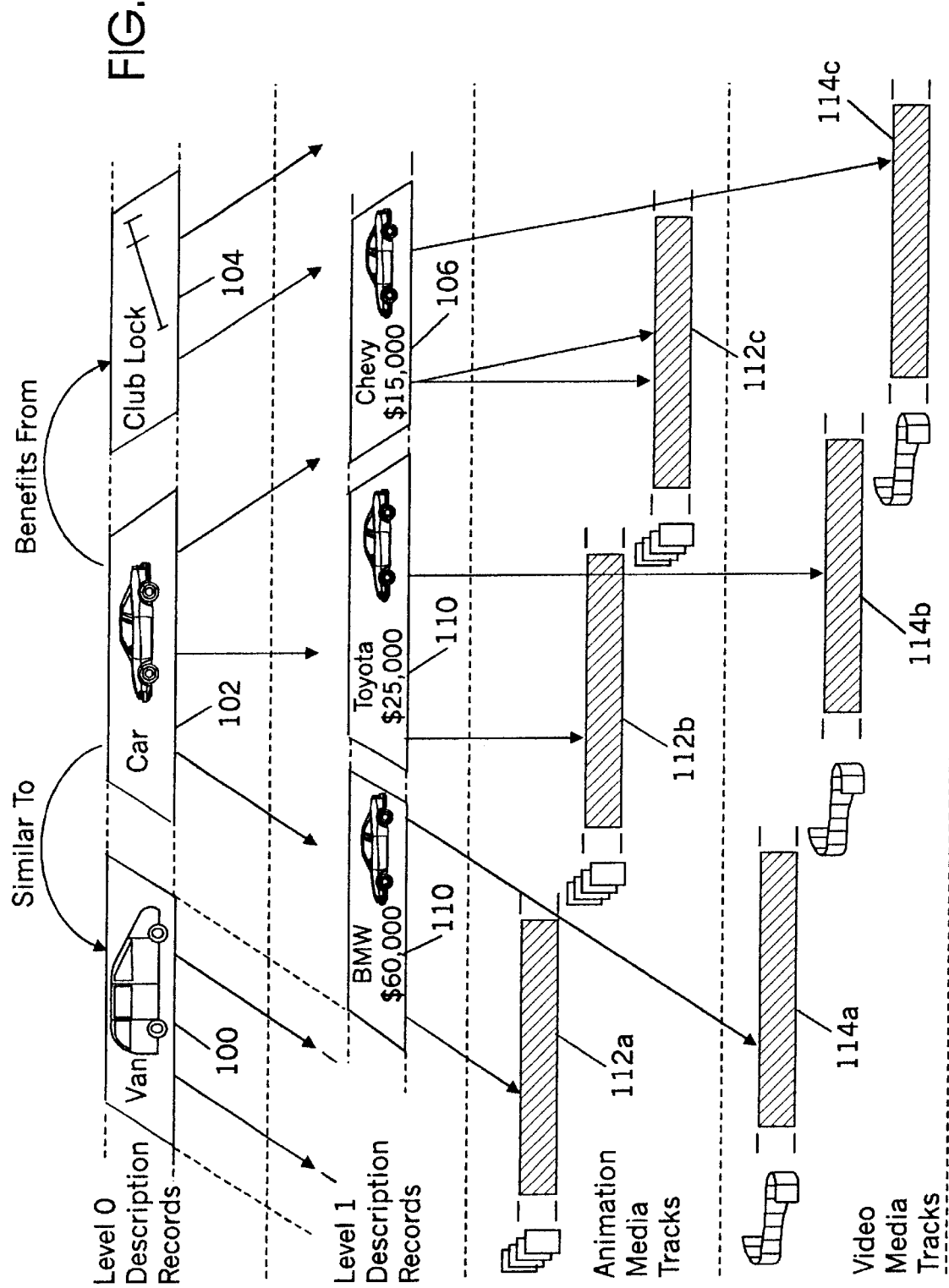
FIG. 1 is a schematic diagram which shows a typical selection process.

FIG. 1 shows a hierarchical description of a portion of the articles being offered for sale at a website. Description level 0 shows the various goods available at the site. To begin with only level 0 information is loaded into a user's machine. While not loading level 1 and level 2 information until a user interaction sequence leads to such loading appears to be a lazy strategy, the aforementioned copending application provides for material to be loaded when rendering is anticipated during any stage of the presentation for smooth uninterrupted flow of the presentation.

As shown here, the selection of goods offered at a website includes vans 100, four door sedans 102 and accessories 104 for motor vehicles. The illustrated goods are only representative of the selections. The dashed vertical lines that separate the illustrated items from each other indicates that these level 0 items are not adjacent items in the browsable sequence, but are separated by segments of data for other items offered at the website. All the goods or the browsable sequence are linked by some semantic relationship. For instance, the van 100 is linked semantically to the sedan 102 as an item "similar to" it. While the accessories 104 are linked semantically to the sedan 102 by "benefits from" relationship. The user being presented with the level 0 choices on the screen selects what he or she is interested in: say, the purchase of a four door sedan as opposed to a van or an accessory. Where transitioning down from level 0 the level 1 in making a selection within the sedan category transitions are possible across the dashed horizontal lines following an "is a" semantic link. Thus, upon selection of the four-door sedan category, the user is presented with the next level of selections within that category. The level 1 descriptions cover a wide selection of four door sedans divided into price categories (here the range of possible choices is represented by an inexpensive Chevy 106, medium priced Toyota 10 and a expensive BMW 110). Let us assume the user selects the $25,000 Toyota. As provided for in the aforementioned copending application, as the user is proceeding through the process of selection, the material for the presentation is being loaded into the user's computer. Once the Toyota sedan has been selected, the computer is ready to present as a level 2 description either an animation presentation 112 or a video presentation 114 of the selected sedan.

An act of the user with respect to the presentation contains information the user intends to be conveyed by the act. However, other information not intended to be conveyed may be implied from the act. For instance, the choice of the Toyota by the user not only explicitly states his interest in that four door sedan, but can also indicate a price range that he or she is interested in. The selection of a $25,000 car could indicate that the user is interested in a mid-priced car and would not be interested in a more expensive car like a BMW or a less expensive one, such as a small Chevrolet. If the user loses interest in the Toyota sedan he or she is more likely to be interested in another car in the mid-price range than in a high priced luxury car. Therefore, anticipatory loading of presentations should be those of other mid-priced cars, and not those for luxury cars.

In addition to conveying information about the goods the user is interested in, the acts relative to the presentation may provide information about the user. For instance, the repeated choice of an animation or video presentation may indicate something about the user's temperament. By selecting one or the other, the individual may be indicating whether he is interested in details (by selecting the video track), or is impatient and wants information quickly (by selecting the animation track). The length of the presentation can be lengthened or shortened using this information. Also, repetitive acts such as examination of various segments of the animation and video tracks, signals aspects and features of the Camry the user is particularly interested in. As certain segments are repeated, the descriptions of the requested segments can be expanded over and above what would normally be shown. Information obtained with respect to the use's examination of the Camry presentation can also be used to deliver and render information about other automobiles. Information can also be stored for use when the user links up with the website at a later time looking for other goods or services.

Figure 2B:
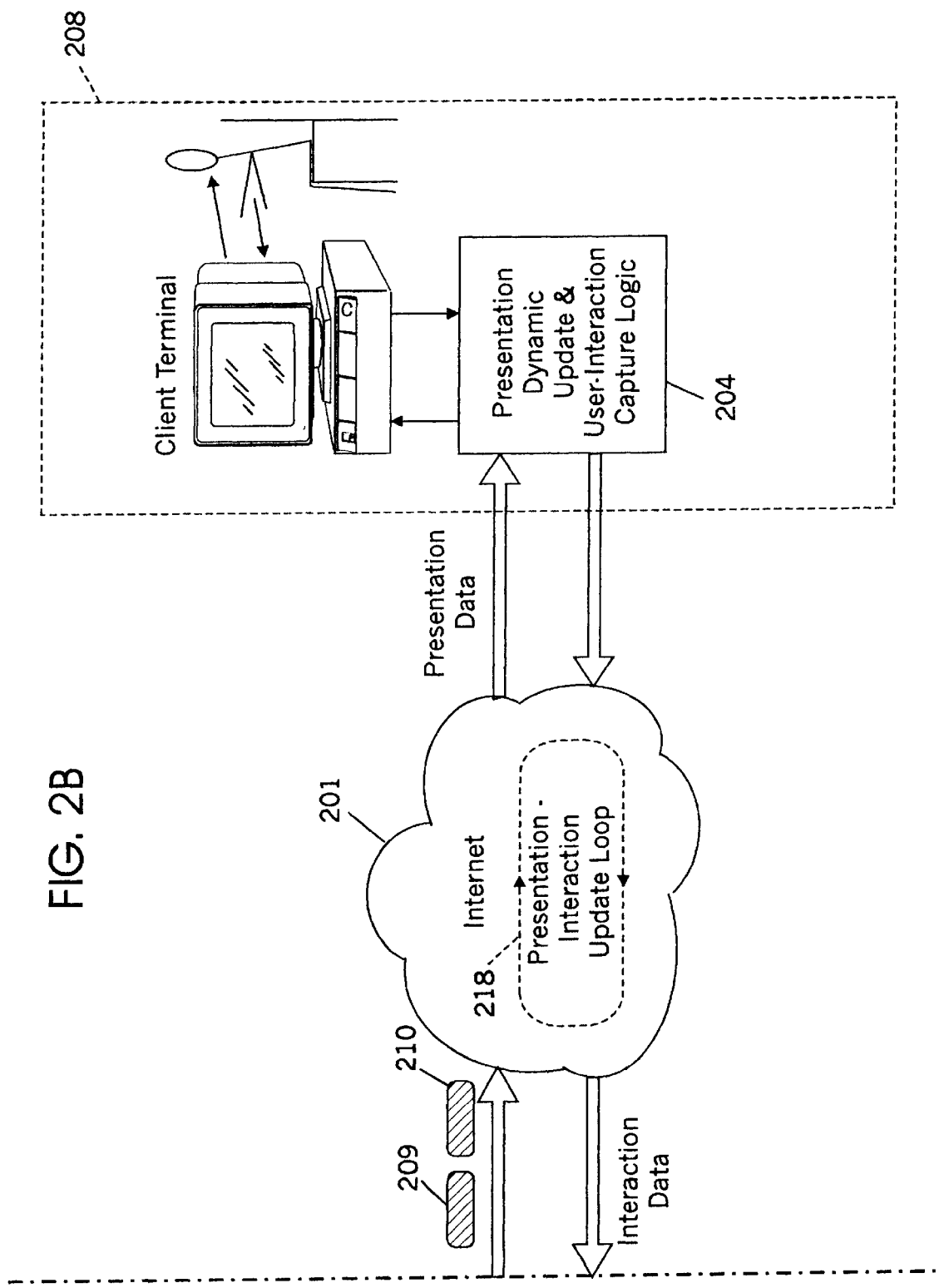

Referring to FIG. 2, as the network server 200 interfaces with the user's terminal 202 over the internet 201, the user 203 interacts with the visual and audible presentations provided to the terminal 202 by the server 200, and software 204 at the user terminal monitors the user's actions. This software is provided by the network server 200 to the user's terminal 202 when product information is initially requested from the website.

The data obtained by the logic 204 is provided over the internet 201 to the server 200 through its network interface 205. The network interface provides this data to the delivery logic 206 in the modelling interpretation logic 207. If the request that can be responded to without interpretation (for instance, a change from the level 0 descriptions to level 1 descriptions), the request is sent by the delivery logic 206 to the presentation files 208 described in the previously mentioned co-pending application. The presentation files provide the requested information which is shipped out in packets 209 and 211 to the client terminal. The delivery logic may also obtain requested information through a media server interface 211 from outside media servers 212a to 212n.

If the request requires interpretation, the network interface provides the information to the modelling interpretation logic 207 which interfaces various software engines 214 to 217 through the non-media engine interface 213. Delivery data is then synthesized for delivery at the network server 200 by putting together in the delivery logic 206 segments from the presentation files 208 and/or media content segments from external media servers 212. The determined as to what the delivery logic 206 should deliver comes from both direct input from the client side through the network interface on new content request, and from the modeling and interpretation logic 207. The modeling and interpretation logic 207 receives all inputs from the user's terminal through the network interface 205, and processes them to provide even more sophisticated responses back to the user in the form of delivery data. To accomplish this, the modeling and interpretation logic not only builds and maintains its own simple session, state and user-model information, but through a non-media engine interface 213 also uses external user-model building, data base search, and statistics gathering engines 214, 215 and 216 respectively.

The modelling interpretation logic 207 takes the user interaction data and provides it to the statistics gathering engine 214 which collates the information provided by the interaction data. The interpretation logic then provides the collated information to the user model building engine 215. The user model building engine analyzes the collated information about the user's actions and builds a model which not only indicates what the user is interested in, but includes an analysis of the user's personal characteristics that will enable modification of the presentation to maintain the user's interest. In addition, the statistical engine 210 can gather user navigational statistics across a multitude of users and derive conclusions about the popularity of products and features. The user model generated by the user model building engine 215 is used by the modeling and interpretation logic 207 in gathering information from the presentation files and outside files to generate a delivery file to transmit to the user over the internet. It is also used by the modeling and interpretation logic to change the rendering of the user's screen and to interrogate the database and search engine 215 of the system. The database search engine 215 provides search results for more complex user queries which are adequately expressed and handled in the rich-media content of the presentation files. Detailed product or feature information which are not expressed in the rich-media content can be obtained from the database search engine and converted by the modeling and interpretation logic 207 to deliverable form to be delivered to the user as presentation data 209.

From the above, it should be apparent that there is a presentation interaction update loop 218 in which the delivery model by which data is delivered and presented to the user is constantly having updated in response to user requests and his response to the material presented. In modifying the delivery model in this way, interest is maintained in the presentation because information that may have been delivered to the user but at a later time becomes apparent that it is of not interest to the user is not rendered. Further, details of the portions of a presentation the user has shown interested in are delivered to the user's terminal and rendered when requested. For instance, instead of providing the user with full video clips, only those portions of the video clip that he has shown particular interest in will be provided. If the user shows particular interest in a aspect of the goods, say the engine in the Camry, the details of that engine will be provided by the database search engine even though it is not included in the rich-media presentation.

The user can provide by simple interaction with media his selection of features which the modeling and interpretation logic 218 can be put together to constitute a complex query. For example he can click on a feature like ABS and a certain seat cover illustration to indicate that he wants the ABS feature, and he would like the texture of seats that is illustrated. The modeling and interpretation logic would construct a query from this and after obtaining a response from the database engine 215, synthesize a response for the client. Therefore, it can be seen that as a user analyzes and selects information on the terminal, he knowingly and unknowingly provides information on what his interests and personality are. This information is used in tailoring the presentation so that it retains his attention.

FIG. 3 contains an example of data movement resulting from the presentation interaction update loop 218 shown in FIG. 2, By making a level 0 description selection 300, the user selects certain data sets of the level 1 descriptors 302. The selected level 1 descriptor sets are concatenated and provided to the user's machine 304. An analysis and selection process of the level 1 descriptors 304 by the user results in transmission to the user's computer of both an animated descriptors from media track one, and a video description from media track two. Again, certain data sets are selected from the presentation files in the server, and concatenated to make up the media track presentation sent to the user's machine. As pointed out above, not all the data in the delivery file sent to the user's machine gets displayed. Instructions from the network server to the client's terminal in response to user's actions and the user model will determine what is actually presented.

Figure 4:
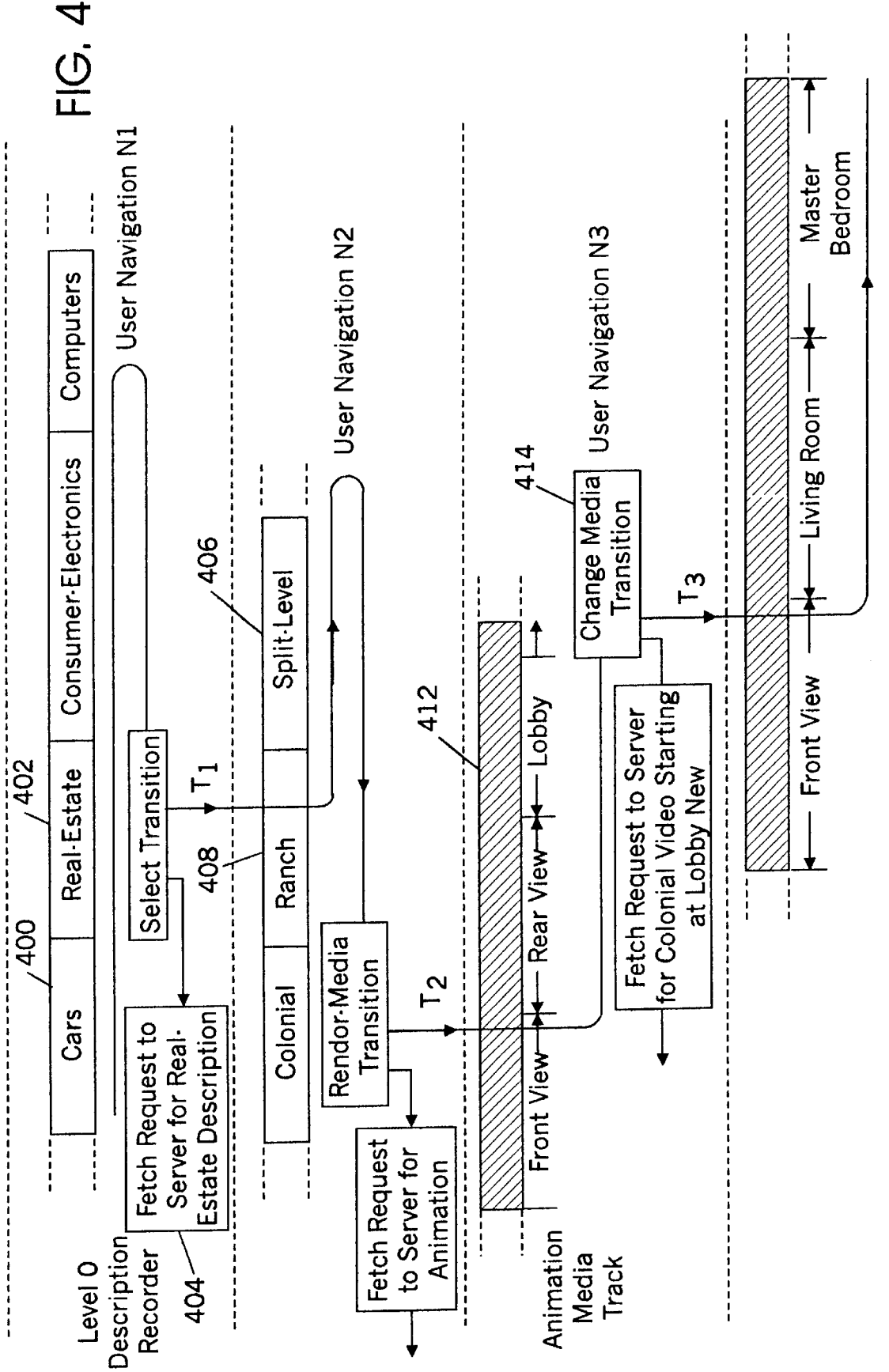
FIG. 4 is a schematic showing navigation through the hypermedia presentation.

Another example of a typical selection process is shown in FIG. 4. A website presents level 0 descriptors of various items such as cars, real estate, consumer electronics and computers are presented to the user of which the user has selected real-estate 402. This selection transaction provides descriptions 404 which are presented in a level one presentation 406. Of the choices presented in the level one presentation, the user has selected ranch properties 408. In selecting ranch properties the user has caused the server to obtain data on ranch type houses 410 in which the user has elected to start out with an animation track 412. The animation track is divided into a number of areas, for instance, front view of the house, rear view of the house and the hallway. By dwelling on certain aspects of the house and ignoring others, the user indicates his particular interests. For instance, should be would pay particular attention to bathrooms or kitchens and little attention to the neighborhood in which the house is located, he is indicating what aspects of the properties he has particular interest in. After reviewing the animation media, the user decides that he wants to review the video track 414. Here the user again dwells on certain portions of the video as opposed to other portions. In so doing, the user provides information, both intentionally and unintentionally, as to what he is interested in and not interested in.

Figure 5:
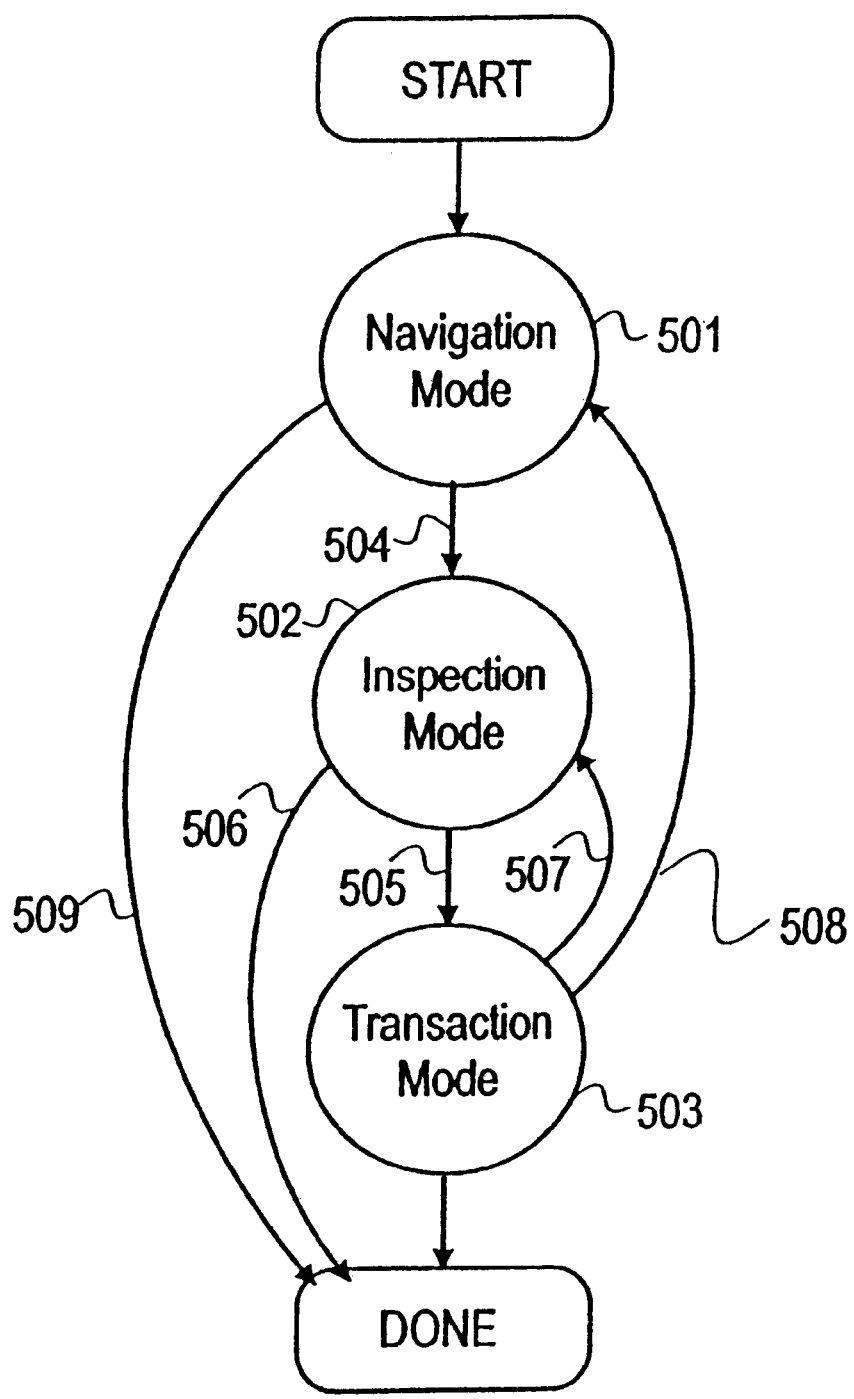
FIG. 5 is a graphic representation of the possible modes of operation in the presentation.

Referring now to FIG. 5, the system operates in three different modes. One is the navigational mode 501 where the user has selected a website and browses the choices available on the website. This mode would be equivalent to movement in level 1 or between level 0 and level 1 description levels of FIG. 1 where the user moves between categories, selects a category and examines choices within the selected category. The second mode is an inspection mode 502 in which the user has selected some item that be is interested in and is looking for more information about that item, This level is equivalent to movement in level 1 such as switching back and forth between the choices in the category, view animation or video of a selection zoom in on points of interest of the selection etc. The third mode is the transaction mode 503 where the user has reached the point where he is probably interested in purchasing his selection and is looking for details that he is interested in. When the user enters this either purposely or inadvertently, he is probably ready to transaction business and is given choices to facilitate the transaction. He can selected features, obtain quotes, request a sales representative, etc.

Figures 6, 6A:
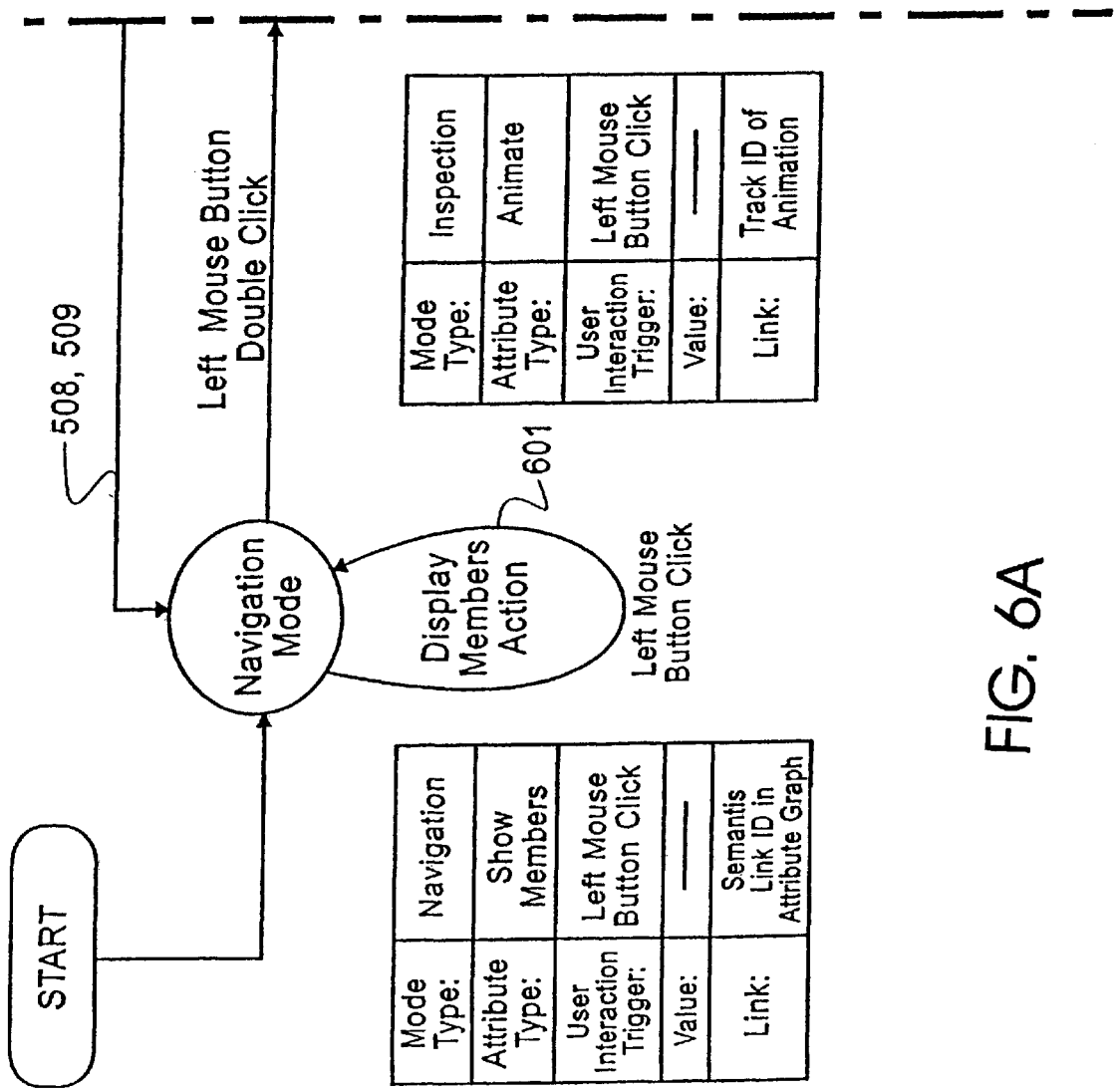
FIGS. 6A and 6B are a diagram illustrating user selection of movement within and between the modes of operation by using a mouse.
Figure 6B:
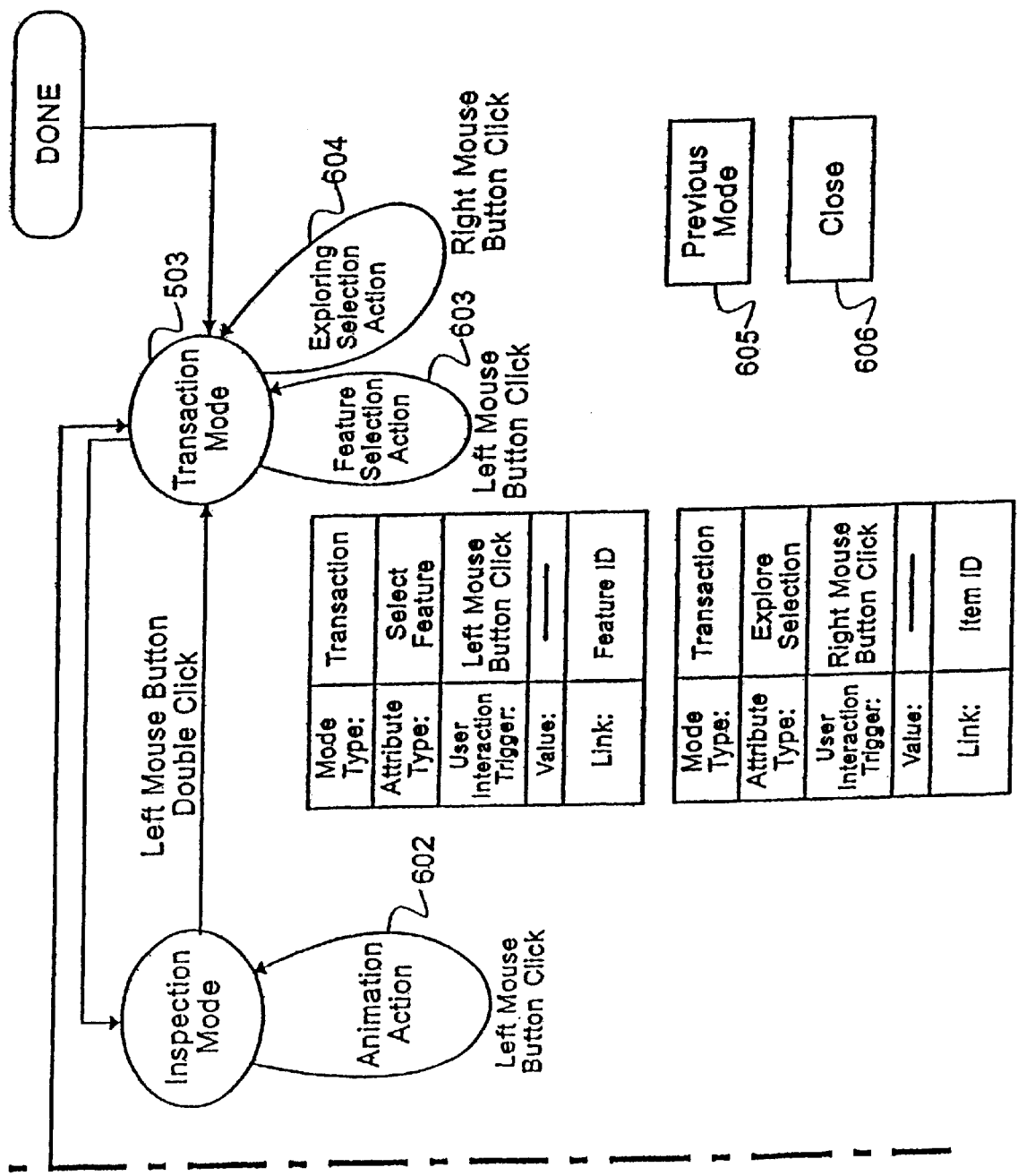

The user can move from one mode to another and move out of the system at any point in the system paths 504, 505, 506, 507, 508 and 509 permit free movement between the various modes. As shown in FIG. 6, movement within a mode can be accomplished by the lick of the mouse. As shown, this movement along paths 601 and 602 within navigation and inspection modes 601 and 602 is done with a single click of the left mouse button between selectable attributes in that mode, while movement in the transaction mode along paths 603 or 604 is performed by a single click of the left or right hand mouse buttons respectively to select features or to review selections. Movement between two adjacent modes in the forward direction or in other words, from navigation mode 501 to inspection mode 502 or from inspection mode 502, to transaction mode 503 is performed by a double click on the left mouse button. Movement backwards or closing is performed by clocking on the appropriate icon: for instance, going from transaction mode back to inspection mode or from inspection mode back to click on the previous mode icon 605 going from any mode to the finish would be done by selecting the close icon 606. The tables in this figure summarize certain information about the modes.

Figure 7:
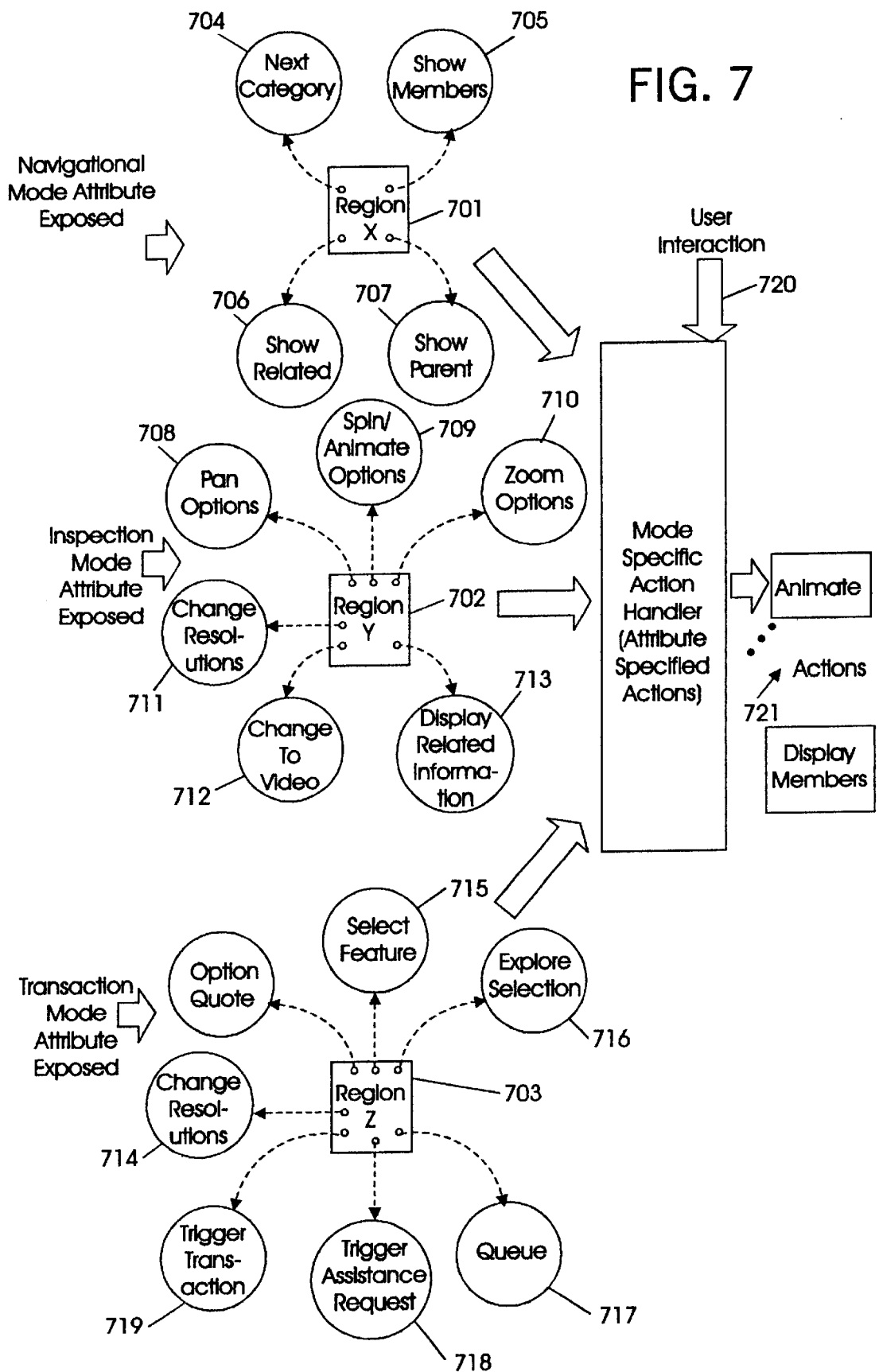
FIG. 7 shows the attributes of the various modes of operation.

FIG. 7 shows actionable attributes that can be enabled in each of the previously discussed modes in connection with various regions 701, 702 and 703 appearing on the user's screen. The navigation mode region 701 can enable the user to move between categories, such as cars or houses or home furnishings, by enabling the next category attribute 404. He can also move within a category to examine the various members of the category 705. For instance, if he has previously selected the automobile category he could scan between the BMW's, Camry's and other cars. The user can also look for an equivalent 707 for four-door sedans: he can choose from SUVs, vans or pickup tracks. He can also backstep to the overall category 707. If he is in the automobile category, he can backstep to other categories offered by the website such as houses or furnishings 708.

In the inspection mode choices are available in region 702 for the user to pan his selection for available options 708. He can also spin and animate the goods 709 so he can view them from various angles and can zoom in on the goods 710. He can change the resolution of the display 711; change from an animation to a video presentation 712 and can obtain related information 713 such as cost and warranty terms.

In the transaction mode, choices are made available in region 703 for the user to obtain a quote on what he intends to purchase 714, select features that he is interested in 715, examine what features are available 716, query the computer for items in the same price range 717, call for a live sales representative 718 and complete the transaction 719. He can select features 715 by simple clicks on features exposing attributes for example. By clicking on a red colored object in the image being displayed, he can select the color red. By clicking on the sun-roof in the display of a car, he can select the sun-roof feature. When he makes a query 714 next, it would automatically include his preference for a red colored car with sun-roof.

Information provided by the actionable attributes is provided to an action handler 720 on the user's terminal and forward to the modeling and interpretation logic 228 of FIG. 2 which responds to provide the material 721 requested by the interaction back to the user. Besides the information provided by the actions taken with respect to the regions 701 to 703, information on how the user interacts with the computer 722 (obtained as hereinafter described in connection with FIG. 10) is provided after the action handler 720.

Figure 8:
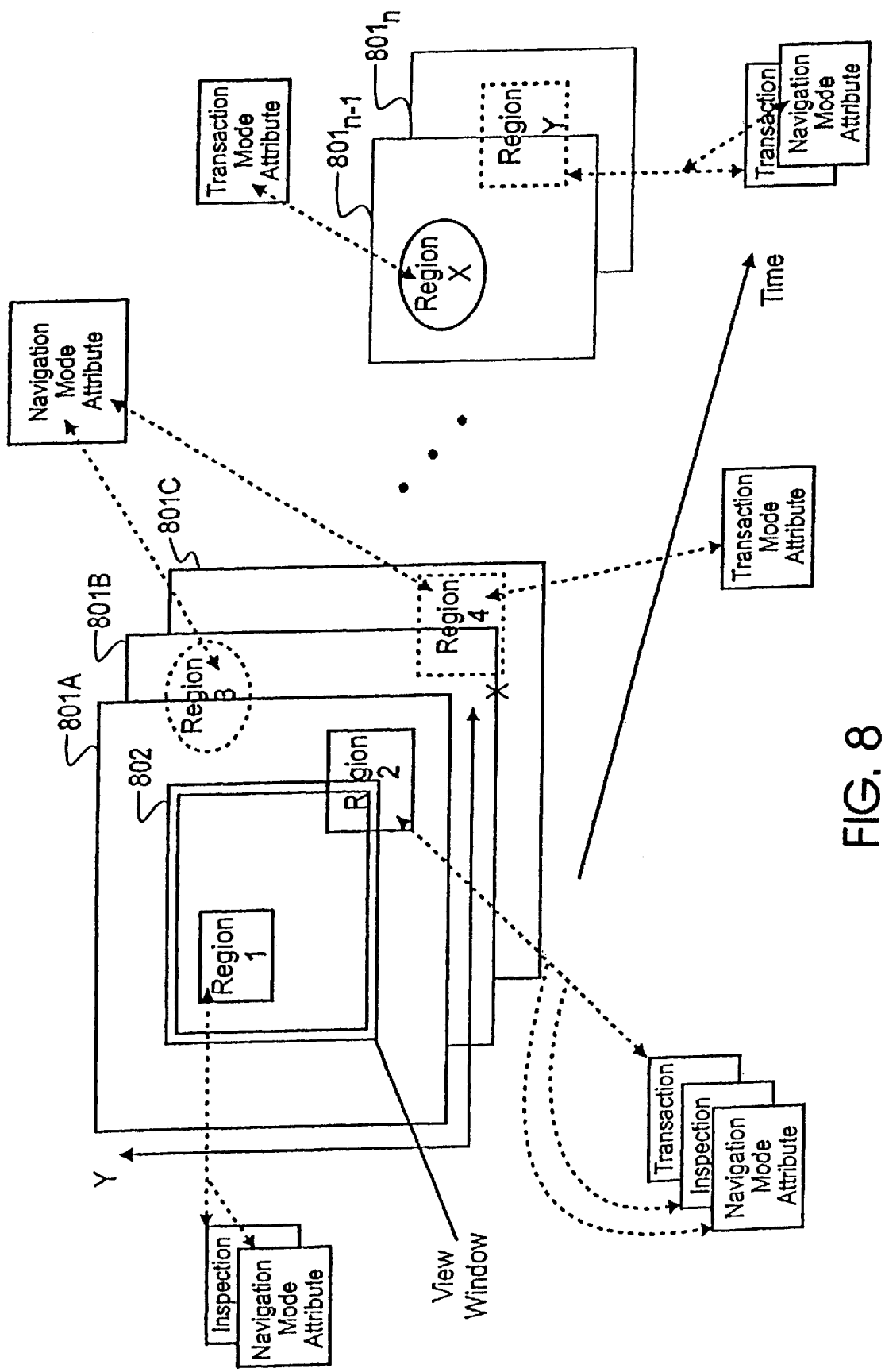
FIG. 8 is a three dimensional representation of the segments of a presentation.

As shown in FIG. 8, as the user scans through a presentation he passes from one data segment to another 801a to 801n of the presentation. Switching between the segments 801a to 801n in sequence can be; automatic at preset intervals; can be initiated by the user at his request; or can be a combination of automatic and manual actions. In each segment 801 a portion or the whole of the segment appears on the screen 802 of the user's computer. The user can expand the view to cover the whole segment, reduce the view to minimize the area of the segment that can be viewed, or can move the view to select material within the section that can be viewed. (For instance, he could move the view to eliminate region 1 and include the whole of region 2.)

By clicking on any given region, the user may or may not be able to obtain a reaction by the computer to the clicking. For instance, by clicking on region one he is able to move into transaction mode from navigation mode and exercise the actionable attributes of the transaction mode and by clicking on region 2 the user can move between the transaction, inspection and navigation modes to exercise attributes of each. The available attributes can be articulated in the region or may be intuitive. Once he has exhausted his interest in a segment, the segment will move to the next segment in the presentation sequence. As pointed out, he can have segment change completely under his control and/or move from segment to segment at a preset rate. That rate is adjustable by the user to a rate he is comfortable with. Of course if a selection is made, the selection may result in a segment change which is out of sequence, for instance constitute a movement from segment 801a to 801n−1.

Figure 9:
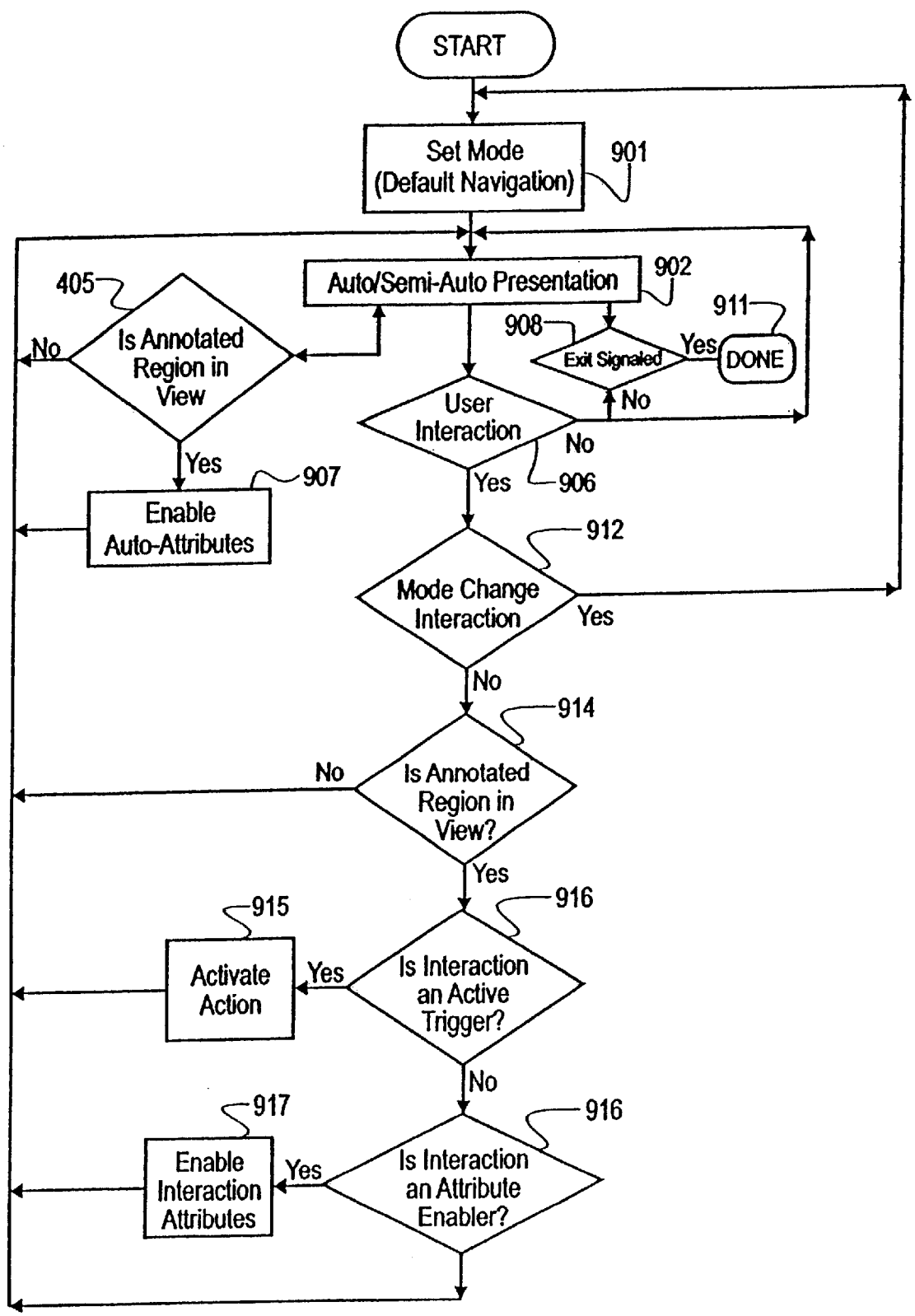
FIG. 9 is a flow diagram of movement within the presentation of FIG. 7.

In FIG. 9, a flow diagram of the systems response to the user's selection process is shown. On opening a presentation, the system defaults into navigation mode 901 and the user selects automatic or semiautomatic presentations of the data segments 902. The system then displays the first segment 801a of FIG. 8 for user response. The machine then checks to see if an annotated region is in view 905. If no annotated region of the segment is in view, the screen view is changed 902 until one does come in view or a user interaction 906 or exit signal 908. When an annotated region is in view 905, the machine checks to see if attributes will be displayed automatically from that view or alternately must be selected by the user. If some attributes are displayed automatically, the computer displays such attributes 907. The machine checks to see if user interactions takes place 906. If no user interaction takes place, the segment is reset in automatic or in semiautomatic mode 902. If an exit signal 908 is detected, the session ends 911.

If the user's action involves a mode change 912, the machine returns to the set mode step 901 and the process represented by steps 901 through 912 is repeated with the exception that a mode reset may not involve a segment change. If the user action does not involve a mode change but a segment change is involved, the process returns to check the annotated segment view of step 905 and proceeds back through steps 907 to 901 or directly to 901, as previously described. If no mode or segment change is involved with the interaction and an annotated region is in view, the user gets to activate an action 915 of an enabled attribute causing a system response if the interaction is an action trigger 916. If it is not, the user gets to enable new attributes of the interaction in an attribute enabler 918. As a consequence of activating actions 915, the machine returns to step 902, depending on the affect of the user's action. If no annotated region is in view in step 914, or if interaction is not an action trigger, step 916 as well is not an attribute enabler in step 918. Then the process returns to step 992 on continuation of presentation and monetary interactions.

Figure 10:
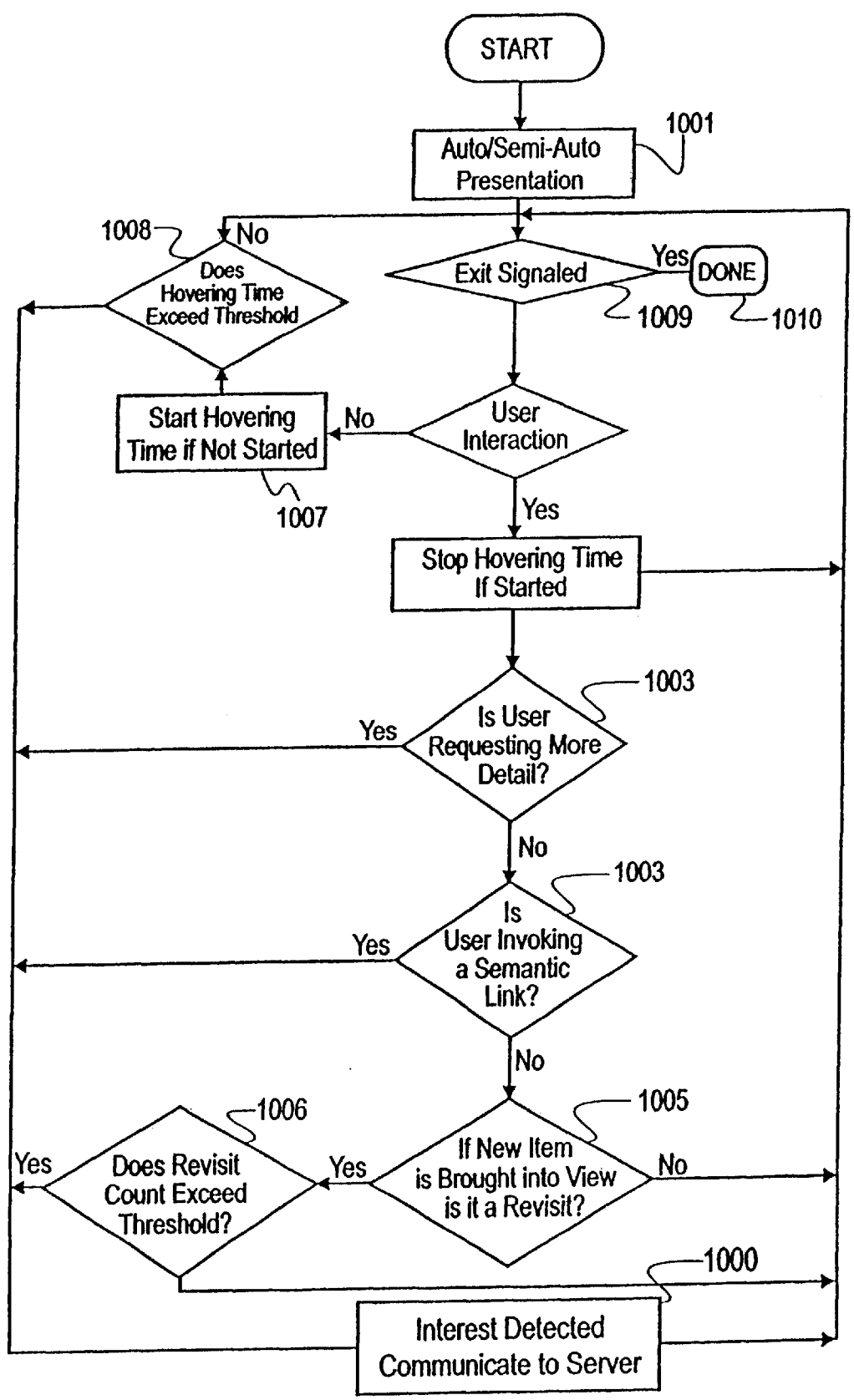
FIG. 10 is a flow diagram illustrating the accumulation of data on the customer's computer as a result of interaction with the server.

As pointed out above, copending U.S. application, Ser. No. 09/100,418, discusses how the transmission of code and data of the expressed decisions of the user are transmitted from the user's machine to the server to model the response in accordance with the user's wishes. In accordance with the present invention, information about the user's personality is transmitted to the server 1000 along with the overt decisions of the user. As shown in FIG. 10, after selection of the automatic or semiautomatic presentation 1001 of the material the software transmitted to the user's station tracks his interaction 1002 with the machine. It notes whether the user is asking for more detail 1003; is using a semantic link 1004; and checks whether an item brought into view 1005 is a new item or one that has been revisited. A counter keeps track of the number of times a site is revisited and when that number exceeds a threshold level (say three times), that fact is noted 1006. In addition to the above information, the computer monitors the time the user spends on a screen 1007. The hovering time is checked 1008 and when the hovering time exceeds threshold that information is noted. The user reactions of steps 1003 to 1006 and step 1008 are transmitted back to the server 1009. Unless the session is terminated 1010 and the user exits the website 1011, the process continues to monitor the user's interactions 1002 in steps 1003 to 1008. As the user actions provide information, it is used by the server to alter the data provided to the user's terminal. For instance, the users continued revisiting of a material covering a particular portion of a product or dwelling could invoke the server to provide more information about that part of the product. An example of this would be to provide more information of an automobile engine when the user shows particular interest in that part of the car.

Figure 11:
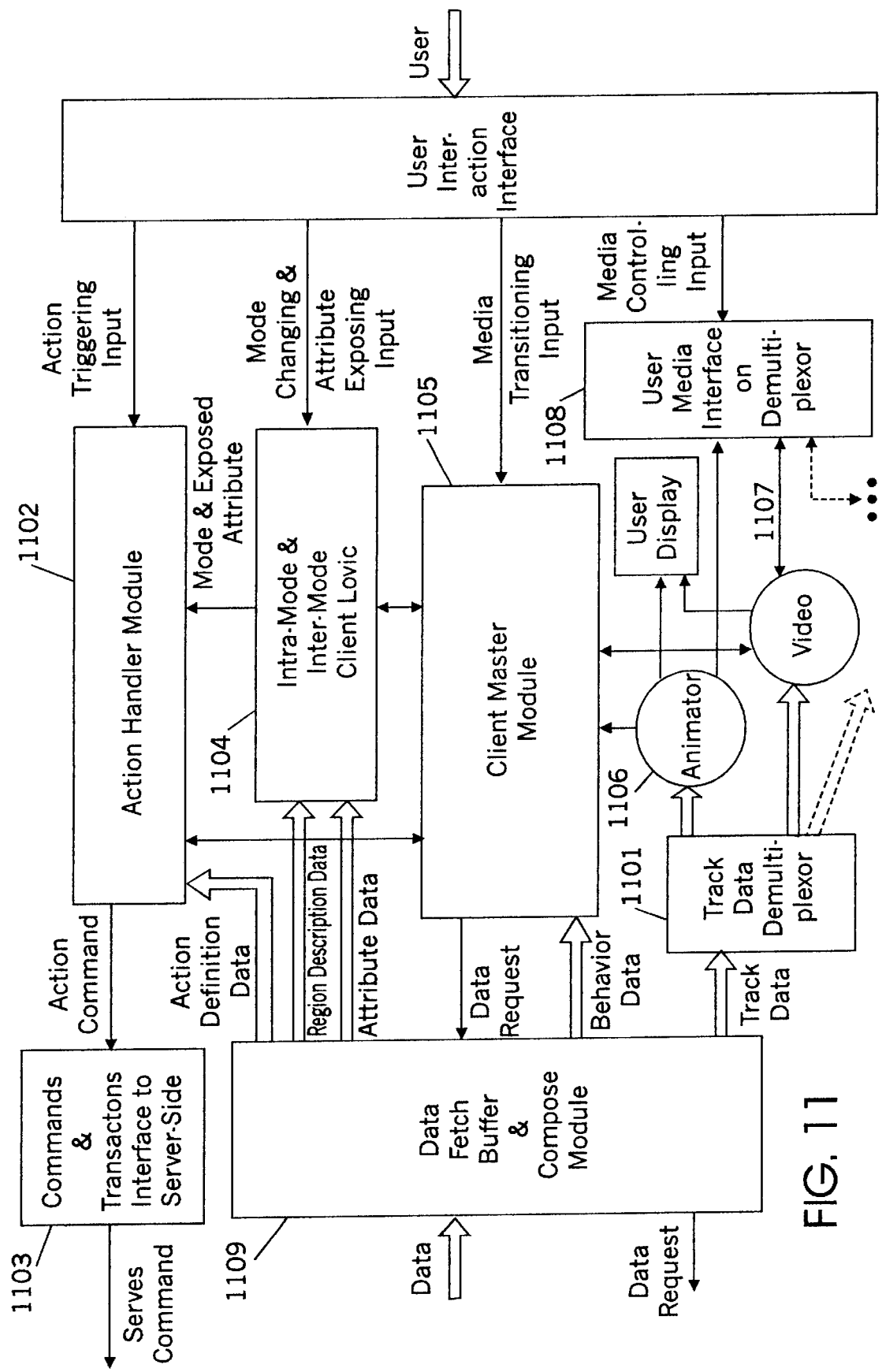
FIGS. 11 and 12 are block diagramS of software in the user's terminal.

The server also provides instruction to the user's terminal to control the rendering of the presentations on the user's terminal. Referring to FIG. 11, logic provided to the user's computer includes a user interaction interface 1101 for interfacing user's action relative to the presentation. The use interaction interface interprets the action of the user dividing the action into categories; the first category being an action requiring a change of material appearing on the screen. A response to this action is provided to the action handler module 1102 which provides an action command to a command and transaction interface 1103 to the internet connection to the web server. The action handler module contains a table lookup of action triggering inputs and the consequent action commands. This table is loaded into the action handler module as action definition data from the server through the data fetch buffer and compose module 1109 on initial loading of the data and software. A second category of user action involves a change in mode or exposing an attribute. In response to this type of action, a command is provided to the intramode and intermode client logic 1104. The intramode and intermode client logic provides inputs to the action handler module 1102 as to the mode of operation and exposed attributes involved in the action triggering input so that the action handler module can modify the action command based on these inputs. The intramode and intermode client logic 1104 receives region description data and attribute data from the server through the data fetch buffer and compose module 1109. A third category of user action involves a media transition, the action is conveyed to the client master module 1105. Client master module controls the selection process of the various types of media involved represented by animation and video presentation 1106 and 1107 respectively; activating the appropriate media type in accordance with a media transition request imbedded in a user action. The client master module 1105 responds to accumulated behavior data provided by the server through the data fetch buffer and compose module 1109, and provides data requests to the data fetch buffer and compose module to be transmitted to the server where such data is needed. The client master module also provides a signal to the action handler module 1102 to provide the appropriate action command to the commands and transactions interface to the server side 1103. A fourth category of user action provides, through the user media interface 1108, controls to manipulate the video, animation and other presentations rendered to the user at the user's terminal. As pointed out above, the client master module 1105 provides data requests to the data fetch and buffer control module 1109 when the action requires data from the server. Media data is provided to the track and data demultiplexor 1111. The data fetch and buffer module 1109 also provides accumulated behavior data from the server to the client master module 1105 as to what media data to present to the user based on the user model.

Figure 12:
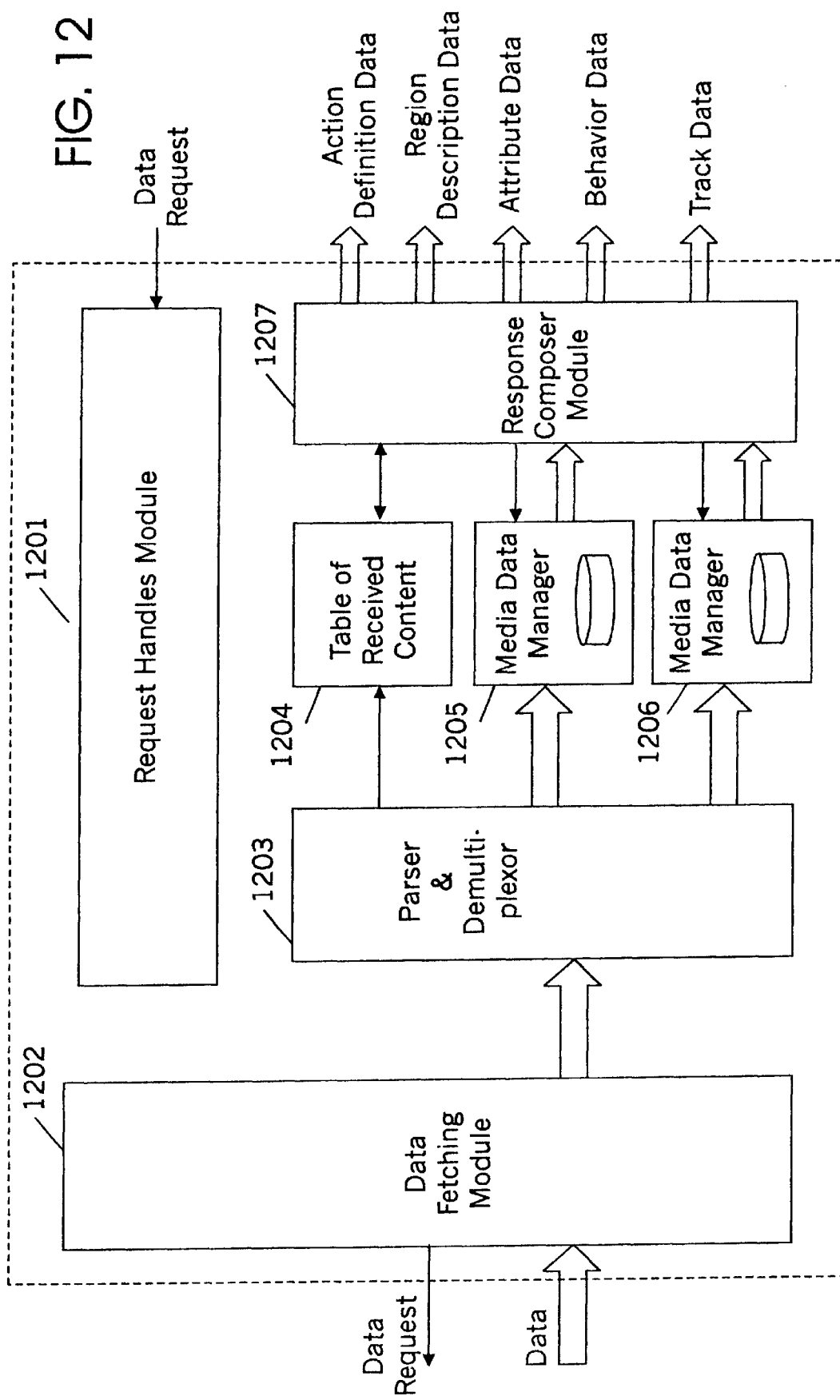

The content of data fetch buffer and compose module is shown in FIG. 12. Data requests from the client master module are fed into a request handler module 1201 which feeds the request through the data fetching module 1202 out into the internet. In response to the data fetching module, data received on the internet is fed by the data fetching module 1202 into the data parser and demultiplexor 1203. The parser divides the information into three categories: one is a table of the received content 1204, second is media data sent to a media data module 1205 and third is media data sent to a meta data manager 1206. The outputs of the table and the two managers are sent to a composer 1207 which dives the data into the various signals produced by the buffer. The action definition data, the region description data and the attribute data and the behavior data being the meta data while the track data is media data.

As should be apparent, the above described hypermedia delivery infrastructure over a network which has several advantages.

Firstly, it enables the optimized delivery of hypermedia content to client terminals. This is achieved by associating descriptive attributes with media stream segments and sending these attributes along with the link information concerning which media segments they refer to, ahead of the media segments themselves.

Secondly, by employing hypermedia navigation and interaction as the means of providing user input, it offers a vastly extended space to gather user input for building user models for targeted content delivery as well as input expressing user selections and queries. The success of intelligent user modeling engines rest on the availability of a sizeable amount of input data from the user pertaining to his or her tastes, preferences and attitudes.

Thirdly, the framework enables the dynamic personalization of content based on the continuous refinement of the user model being synthesized on the network server. This results in the delivery to the user's terminal, updated media stream data that more closely represents the user's taste and preferences as determined currently by the user model.

Another advantage, is the delivery to the user's terminal of updates to the descriptive attributes of media stream data while the media stream data itself is not updated. Essentially, this amounts to describing the exact same content in a different way after having attained a better understanding of the user's attitudes and tastes.

A further advantage is that of delivering to the client terminal, updates to the navigational semantics after having attained a better understanding of the user's navigational preferences. For example, the user model could take note of the user's preference for certain media types and employment of certain preferred navigational activity within them, and help redefine the user interaction semantics to make this subset of activity extremely easy to invoke.

Above we have described one embodiment of the present invention. A number of modifications and improvements may be made in this embodiment by those skilled in the art. Therefore, it should be understood that the scope of the invention is not limited to this described embodiment but encompasses the scope and spirit of the appended claims.

What is claimed is:

1. A method for providing personalized media presentations over a network to user's terminal comprising:

delivering to the terminal hypermedia presentation streams of rich media material and a hierarchy of the hypermedia descriptions of hypermedia presentation streams for navigation by the user on the descriptions and presentation streams in at least three different modes of operation;

exposing a different set of selectable attributes in each the modes of operation;

allowing the user to switch between the modes and once in a particular mode select selectable attributes exposed in that mode;

gathering data about the user's interests expressed through selection events generated at the terminal by the user's navigation over the descriptions and presentation streams;

using the gathered data to generate a user model; and dynamically changing what is delivered and rendered at the terminal in response to a new selection event in the user model based on the gathered selection events and reflected in the user model.

2. The method of claim 1 including dividing the hierarchy of hypermedia descriptions into a plurality of description levels in at least two of the modes where levels higher up in the hierarchial structure represent more abstract attributes of represented objects and levels lower in the hierarchial structure represent further refinements on those attributes.

3. The method of claim 2 including rendering the hierarchy of descriptions at the terminal so that the user first navigates over the hierarchial structure at a more abstract level and transitions to navigation over less and less abstract levels.

4. The method of claim 2 including first delivering to the terminal a hypermedia presentation stream at a level of the hierarchy with more abstract attributes of an item and thereafter delivering to the terminal at that level of the hierarchy in order of increasing refinement only those of the attributes in the hypermedia stream that reflect the user's interest and personality as expressed by navigation events.

5. The method of claim 2 including dynamically updating the content of certain of the abstract descriptive attributes in a hypermedia stream depending on the user's interest reflected by the user's navigation events while the remainder the hypermedia stream data itself is not replaced, to provide a more personalized description of what would be the same media content.

6. The method of claim 5 wherein three different modes of operation in a presentation includes;

a first navigation mode providing descriptive attributes for navigating a website including showing different categories, different members of the same category, and parent categories;

a second inspection mode providing descriptive attributes for examination of a selection in a category of goods including video and animation views of the selection panning and zooming in on the selection in a view and animating and rotating of the selection in a view; and a third transaction mode providing descriptive attributes to facilitate acquisition of the selection including examining various options for the selection, comparison shopping for comparable items to the selection, calling for a sales representative, and completing the transaction.

7. The server of claim 6 including, associating different descriptive attributes with different segments of an item in the hypermedia presentation involved in the client's navigation or interaction; and expanding in later viewing by the user the descriptions of the segments of the item which the user has shown interest by the user's navigation events while leaving descriptions of other segments of the item unchanged.

8. The method of claim 1 including using explicit selection events and implicit selection events in generating the user model.

9. The method of claim 8 wherein an implicit selection event is one of the following events; repeated requests for more detail in the hypermedia presentation; dwell time on a rendered portion of the hypermedia presentation; and return parameters relative to a rendered portion of the hypermedia presentation.

10. The method of claim 8 including delivering an input to a user model based on a descriptive attribute associated with a portion of the hypermedia presentation involved in a selection event.

11. The method of claim 10 including providing entry input points for transactional commands whose parameters are determined by the descriptive attributes associated with the segment of the hypermedia involved in the navigation or interaction of the user.

12. The method of claim 11 including annunciation of a portion of the hypermedia presentation associated with an entry input point involved in the navigation or interaction by the user.

13. The method of claim 10 including varying descriptive attributes in a given portion of the hypermedia presentation depending on the mode of operation covered by that given portion.

14. A server for delivering personalizable media presentations to a user's terminal on a network comprising:

production logic for generating and continuing refining a user model of a user's requirements and temperament expressed through selection events generated by the user in navigation over a hypermedia presentation and a hierarchy of hypermedia descriptions of the presentation rendered at the user's terminal;

selection event capture software for transmission to the user's terminal for capturing user selection events and providing them back to the server; and delivery logic responsive to the user model refined by one of the captured selection events, for delivering hypermedia streams containing the rendered presentation and the hierarchy hypermedia descriptions to the user's terminal, said delivery logic having rendering logic for dynamically changing the rendered presentations and hypermedia description based on said one of the selection events used to refine the user model.

15. The server of claim 14 wherein the hierarchy hypermedia description is represented in a multitude of description levels where levels higher up in the hierarchy represent more abstract attributes and levels lower in the hierarchy represent further refinements on the more abstract attributes.

16. The server of claim 14 wherein said selection event capture software includes code for providing inputs to user model to determine user's temperament based on implicit navigational actions of the user over the hypermedia.

17. The server of claim 16 wherein the implicit events include repeated request for details, dwell time and return parameters relative to portions of the hypermedia presentation.

18. A method for delivering personalizable media presentations to a user's terminal on a network comprising:

delivering rich media hypermedia presentation streams after first delivering and initially rendering in rich media a hierarchy of hypermedia descriptions of the hypermedia presentation stream for client navigation on the hypermedia descriptions;

loading the hypermedia presentation streams on the user's terminal based on user's selection events during navigation of the hypermedia descriptions;

constantly refining a user model based on the selection events;

varying selection and query inputs to points in the hypermedia descriptions in response to the selection events;

dynamically presenting to the user with the aid of the constantly refining user model, changes to the hypermedia presentation based on the user experiences first with the hypermedia description and then the hypermedia presentation;

dividing the presentation into three different modes of operation;

exposing a different set of selectable attributes in each of the modes of operation; and allowing the user to switch between the modes of operation using one control action and once in a particular mode select selectable attributes in that mode using a different control action.

19. The method of claim 18 including representation by a hypermedia file is represented in a multitude of description levels where the description levels belong to a hierarchical structure where levels higher up in the hierarchial structure represent more abstract attributes and levels lower in the hierarchial structure represent further refinements on those attributes.

20. The method of claim 19 including presenting the hierarchy of descriptions on the client's terminal so that the client always first choose to navigate over representations at the most abstract level, of the descriptions, and transition to navigation over representations that correspond to less and less abstract descriptions.

21. The server of claim 18 wherein, said selection capture software includes counting software for determining the number times particular displayed material is visited and when a threshold level is exceeded providing user interest in that material back to the server.

22. The server of claim 21 wherein, said selection capture software includes timing software for timing user hovering on displayed material and when a time threshold is exceeded providing interest in that material back to the server.

23. The method of claim 18 wherein, the one and the different control actions are multiple and single mouse button clicks respectively.

24. The method of claim 18 wherein three different modes of operation in a presentation includes;

a first navigation mode providing descriptive attributes for navigating a website including showing different categories, different members of the same category, and parent categories;

a second inspection mode providing descriptive attributes for examination of a selection in a category of goods including video and animation views of the selection;

panning and zooming in on the selection in a view and animating and rotating of the selection in a view; and a third transaction mode providing descriptive attributes facilitate acquisition of the selection including viewing various options for the selection, comparison shopping for comparable items to the selection, calling for a slates representative and completing the transaction.

25. The server of claim 24 including, associating different descriptive attributes with different segments of an item in the hypermedia presentation involved in the client's navigation or interaction; and expanding in future viewing by the user the descriptions of the segments of the item which the user has shown interest by the user's navigation events while leaving description of other segments of the item unchanged.

26. The method of claim 18 including:

dividing the presentation up into data segments and permitting the user to select between:

a manual mode where progress through the segments is by manual selection of the segments by the user;

an automatic mode where progress through the segments is from segment to segment at preset intervals; or a semiautomatic mode where passing from one segment to another is a combination of manual and automatic actions.

27. The method of claim 26 permitting the user to select between rendering a portion or the whole of the data segments.

* * * * *